3,071,582
DERIVATIVES OF 3β-HALO - 17α - (CARBOXYETH-YL)-Δ⁵-ANDROSTEN-17β-OL-LACTONE AND 3β-HALO-17α(CARBOXYVINYL) - Δ⁵ - ANDROSTEN-17β-OL-LACTONE
John A. Zderic, Palo Alto, Calif., and Otto Halpern and Jose Iriarte, Mexico City, Mexico, assignors, by mesne assignments, to Syntex Corporation, a corporation of Panama
No Drawing. Filed Jan. 17, 1962, Ser. No. 166,951
20 Claims. (Cl. 260—239.57)

The present invention relates to novel cyclopentanophenanthrene derivatives and to a process for the production thereof.

More particularly the present invention relates to derivatives of 3β-halo-17α-(carboxyethyl)-Δ⁵-androsten-17β-ol-lactone and 3β-halo-17α-(carboxyvinyl)-Δ⁵-androsten-17β-ol-lactone.

The novel compounds of the present invention which are diuretic compounds showing anabolic, anti-estrogenic and anti-gonadotrophic activities are represented by the following formulas:

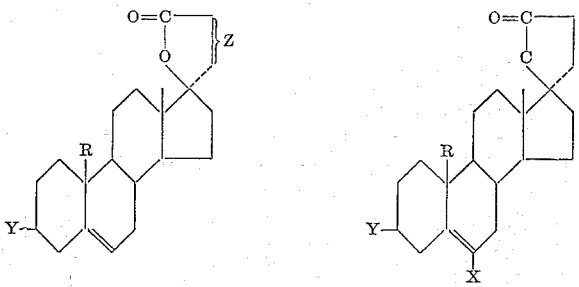

In the above formulas R represents hydrogen or methyl; X represents fluorine or chlorine, Y represents fluorine, chlorine or bromine; and Z may be a double bond or a saturated linkage.

The novel C–6-unsubstituted compounds of the present invention are prepared by the process exemplified by the following equation:

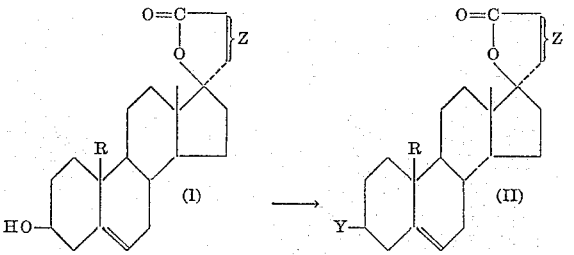

In the above formulas R, Y and Z have the same meaning as previously set forth. In practicing the process outlined above, the starting compound which is a 17α-(2′-carboxyethyl or carboxyvinyl)-Δ⁵-androstene-3β,17β-diol-lactone derivative (I), is treated with a halogenating agent such as phosphorus pentabromide, phosphorus pentachloride or hydrogen fluoride in a solvent inert to the reagent, thus affording the respective 3β-halo derivative (II).

The novel C–6-substituted compounds of the present invention may be produced by the process illustrated as follows:

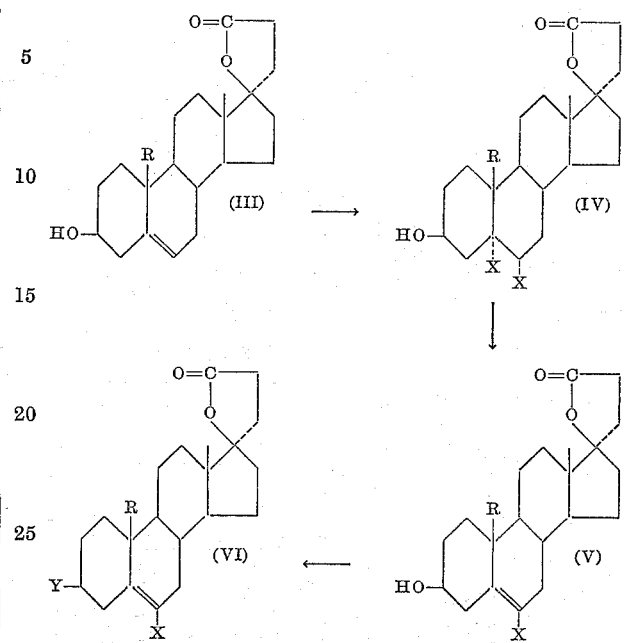

In the above formulas R, X and Y have the same meaning as heretofore set forth.

In practicing the process just outlined, the starting compound which is a 17α-(2′-carboxyethyl)-Δ⁵-androstene-3β,17β-diol-lactone derivative (III) is treated with phenyl iodoso difluoride or dichloride to give the respective 5α, 6α-difluoro or dichloro 17α-(2′-carboxyethyl)-androstane-3β,17β-diol lactone (IV) which upon dehydrohalogenation with a suitable agent such as calcium carbonate in dimethyl formamide, yields the corresponding 6-halo-17α-(2′-carboxyethyl)-Δ⁵-androstene-3β,17α-diol-lactone (V). The latter compound upon halogenation of the 3β-hydroxyl with a suitable agent such as hydrogen fluoride, phosphorus pentachloride or phosphorus pentabromide, yields the respective 3β-fluoro, chloro or bromo-6-halo-17α-(2′-carboxyethyl)-Δ⁵-androsten-17β-ol-lactone (VI).

The following specific examples serve to illustrate, but are not intended to limit the scope of the present invention:

PREPARATION 1

A solution of 5 g. of 17α-(2′-carboxyethyl)-19-nor-Δ⁴-androsten-17β-ol-3-one lactone (Cella et al., J. Org. Chem. 24, 743 (1959)), in 50 cc. of acetic anhydride and 50 cc. of acetyl chloride was boiled for 4 hours under an atmosphere of nitrogen. The reaction mixture was then distilled almost to dryness, cooled, diluted with ether and the organic extract washed with water, then with 5% sodium bicarbonate solution and finally with water. There was thus obtained 3-acetoxy-17α-(2′-carboxyethyl)-19-nor-Δ³,⁵-androstadien-17β-ol lactone.

Following the same procedure, 17α-(2′-carboxyvinyl)-19-nor-Δ⁴-androsten-17β-ol-3-one lactone was treated (Cella et al. v. supra) thus yielding 3-acetoxy-17α-(2′-carboxyvinyl)-19-nor-Δ³,⁵-androstadien-17β-ol lactone.

A solution of 4 g. of 3-acetoxy-17α-(2'-carboxyethyl)-19-nor-Δ$^{3,5}$-androstadien-17β-ol lactone in a mixture of 100 cc. of 95% ethanol and 35 cc. of tetrahydrofuran was cooled at 10° C. and added dropwise, with occasional stirring over a 1 hour period, to a cold solution of 4 g. of sodium borohydride in 50 cc. of 80% ethanol, the reaction temperature not being allowed to exceed 5° C. After completion of addition, the solution was kept at 0–5° C. for 2 hours further; then 200 cc. of 10% sodium hydroxide was added and the solution boiled for 15 minutes. Most of the solvent was removed in vacuo, the residue acidified with 20% hydrochloric acid and the crystalline precipitate collected and washed. Recrystallization of the crude material from acetone furnished 17α-(2'-carboxyethyl)-19-nor-Δ$^5$-androstene-3β,17β-diol lactone.

By the above procedure there was treated 3-acetoxy-17α-(2'-carboxyvinyl)-19-nor-Δ$^{3,5}$-androstadien - 17β - ol lactone to give 17α-(2'-carboxyvinyl)-19-nor-Δ$^5$-androstene-3β,17β-diol lactone.

*Example I*

To a solution of 5 g. of 17α-(2'-carboxyethyl)-Δ$^5$-androstene-3β,17β-diol lactone (Cella et al. v. supra) in 100 cc. of benzene were added 5 g. of phosphorus pentachloride and the resulting mixture was refluxed for 1 hour in the absence of moisture. It was then cooled, poured into water; the benzene layer was washed with water several times, dried over anhydrous sodium sulfate and evaporated to dryness. Crystallization of the residue from acetone-hexane yielded 3β-chloro-17α-(2'-carboxyethyl)-Δ$^5$-androsten-17β-ol lactone.

In accordance with the foregoing technique there were treated: 17α - (2' - carboxyethyl) - 19 - nor - Δ$^5$ - androstene - 3β,17β - diol lactone, 17α - (2' - carboxyvinyl)-19-nor-Δ$^5$-androstene-3β,17β-diol lactone and 17α-(2'-carboxyvinyl) - Δ$^5$ - androsten - 3β,17β - diol lactone (Cella et al. v. supra) yielding correspondingly: 3β-chloro-17α-(2' - carboxyethyl) - 19 - nor - Δ$^5$ - androsten - 17β - ol lactone, 3β - chloro - 17α - (2' - carboxyvinyl) - 19 - nor-Δ$^5$ - androsten - 17β - ol lactone, and 3β - chloro - 17α-(2'-carboxyvinyl)-Δ$^5$-androsten-17β-ol lactone.

*Example II*

In a polyethylene flask, adapted with magnetic stirrer, there was dissolved 2.8 g. of 17α-(2'-carboxyethyl)-Δ$^5$-androstene-3β,17β-diol lactone in 30 cc. of methylene chloride, the solution was cooled to 0° C. and a solution of 12 g. of anhydrous hydrogen fluoride in 20 cc. of tetrahydrofuran cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the soluble material was filtered off and the filtrate cooled whereby there crystallized 3β-fluoro-17α-(2'-carboxyethyl)-Δ$^5$-androsten-17β-ol lactone.

There were treated according to the above procedure: 17α - (2' - carboxyethyl) - 19 - nor - Δ$^5$ - androstene - 3β,17β - diol lactone, 17α - (2' - carboxyvinyl) - 19 - nor-Δ$^5$-androstene-3β,17β-diol lactone, and 17α-(2'-carboxyvinyl)-Δ$^5$-androstene-3β,17β-diol lactone thus giving respectively: 3β-fluoro-17α-(2'-carboxyethyl)-19-nor-Δ$^5$-androsten-17β-ol lactone, 3β-fluoro-17α-(2'-carboxyvinyl)-19-nor-Δ$^5$-androsten-17β-ol lactone, and 3β-fluoro-17α-(2'-carboxyvinyl)-Δ$^5$-androsten-17β-ol lactone.

*Example III*

A mixture of 2.5 g. of 17α-(2'-carboxyethyl)-Δ$^5$-androsten-3β,17β-diol lactone, 1.05 mol. equivalents of phenyl iodoso dichloride and 100 cc. of chloroform was refluxed until the crystals of the reagent disappeared. The solvents were removed and the residue recrystallized from chloroform-ethyl acetate thus yielding 5α,6α-dichloro-17α - (2' - carboxyethyl) - androstane - 3β,17β-diol lactone.

Following the same technique there was treated 17α-(2'-carboxyethyl) - 19 - nor - Δ$^5$ - androstene - 3β,17β - diol lactone thus affording 5α,6α-dichloro-17α-(2'-carboxyethyl)-19-nor-androstane-3β,17β-diol lactone.

*Example IV*

2 g. of 5α,6α - dichloro - 17α - (2' - carboxyethyl)-androstane-3β,17β-diol lactone in 40 cc. of cold dimethylformamide was added over 15 minutes to a suspension of 5 g. of finely divided calcium carbonate in 15 cc. of refluxing dimethylformamide. The mixture was refluxed for 30 minutes further, cooled and filtered. The filtrate was diluted with water and extracted with ethyl acetate. The extract was washed with dilute hydrochloric acid, water, aqueous sodium bicarbonate solution and water, then dried over anhydrous sodium sulfate and evaporated to dryness. Silica gel chromatography and recrystallization afforded 6-chloro-17α-(2'-carboxyethyl)-Δ$^5$-androstene-3β,17β-diol lactone.

By the same procedure 5α,6α-dichloro-17α-(2'-carboxyethyl) - 19 - nor - Δ$^5$ - androstene - 3β,17β -diol lactone was converted to 6-chloro17α-(2'-carboxyethyl)-19-nor-Δ$^5$-androstene-3β,17β-diol lactone.

*Example V*

17α - (2' - carboxyethyl) - Δ$^5$ -androstene - 3β,17β- diol lactone, 17α - (2' -carboxyethyl) - 19 - nor - Δ$^5$ -androstene-3β,17β-diol lactone were treated following the procedure described in Example III, except that phenyl iodoso dichloride was substituted by phenyl iodoso difluoride thus giving respectively: 5α,6α-difluoro-17α-(2'-carboxyethyl) - androstane - 3β,17β - diol lactone and 5α,6α - difluoro - 17α - (2' - carboxyethyl) - 19 - nor-androstane-3β,17β-diol lactone.

*Example VI*

The two preceding compounds were treated following the procedure described in Example IV yielding correspondingly: 6 - fluoro - 17α - (2' -carboxyethyl) - Δ$^5$-androstene - 3β,17β - diol lactone, and 6-fluoro-17α-(2' - carboxyethyl) - 19 - nor - Δ$^5$ - androstene - 3β,17β-diol lactone.

*Example VII*

6 - chloro - 17α - (2' - carboxyethyl) - Δ$^5$ - androstene-3β,17β - diol lactone, 6 - chloro - 17α - (2' - carboxyethyl) - 19 - nor - Δ$^5$ - androstene - 3β,17β, - diol lactone, 6 - fluoro - 17α - (2' - carboxyethyl) - 19 - nor-Δ$^5$ - androstene - 3β,17β - diol lactone, and 6 - fluoro-17α-(2'-carboxyethyl) - Δ$^5$ - androstene - 3β,17β - diol lactone were treated following the procedure described in Example I, affording respectively: 3β-6-dichloro-17α-(2'-carboxyethyl) - Δ$^5$ - androsten - 17β - ol lactone, 3β,6-dichloro - 17α - (2' - carboxyethyl) - 19 - nor - Δ$^5$ - androsten 17β - ol lactone, 3β - chloro - 6 - fluoro - 17α-(2' - carboxyethyl) - 19 - nor - Δ$^5$ - androsten - 17β - ol lactone and 3β - chloro - 6 - fluoro - 17α - (2' - carboxyethyl)-Δ$^5$-androsten-17β-ol lactone.

*Example VIII*

6 - chloro - 17α - (2' -carboxyethyl) - Δ$^5$ - androstene-3β,17β - diol lactone, 6 - chloro - 17α - (2' - carboxyethyl) - 19 - nor - Δ$^5$ - androstene - 3β,17β - diol lactone, 6 - fluoro - 17α - (2' -carboxyethyl) - 19 -nor - Δ$^5$ - androstene-3β,17β-diol lactone, and 6-fluoro-17α-(2'-carboxyethyl) - Δ$^5$ - androstene - 3β,17β - diol lactone were treated by the technique delineated in Example II, thus producing correspondingly: 3β-fluoro-6-chloro-17α-(2'-carboxyethyl) - Δ$^5$ - androsten - 17β - ol lactone, 3β-fluoro - 6 - chloro 17α - (2' - carboxyethyl) - 19 -nor - Δ$^5$- androsten - 17β - ol lactone, 3β,6-difluoro - 17α-(2'-carboxyethyl) - 19 - nor - Δ⁵ - androsten - 17β - ol lactone and 3β,6 - difluoro - 17α - (2' -carboxyethyl) - Δ⁵ - androsten-17β-ol lactone.

*Example IX*

In accordance with Example I, except that phosphorus pentachloride was substituted by phosphorus pentabromide, there were treated: 17α-(2'-carboxyethyl)-Δ⁵-androstene-3β,17β-diol lactone, 17α-(2'-carboxyethyl)-19-nor-Δ⁵-androstene-3β,17β-diol lactone, 17α-(2'-carboxyvinyl)-19-nor-Δ⁵-androstene-3β,17β-diol lactone, and 17α-(2'-carboxyvinyl)-Δ⁵-androstene-3β,17β-diol lactone thus giving respectively: 3β-bromo-17α-(2'-carboxyethyl)-Δ⁵-androsten-17β-ol lactone, 3β-bromo-17α-(2'carboxyethyl)-19-nor-Δ⁵-androsten-17β-ol lactone, 3β-bromo-17α-(2'-carboxyvinyl-19-nor-Δ⁵-androsten-17β-ol lactone, and 3β-bromo - 17α - (2'-carboxyvinyl)-Δ⁵-androsten-17β-ol lactone.

*Example X*

6-chloro-17α-(2' - carboxyethyl) - Δ⁵ - androstene-3β,17β-diol lactone, 6-chloro-17α-(2'-carboxyethyl)-19-nor-Δ⁵-androstene-3β,17β-diol lactone, 6-fluoro-17α-(2'carboxyethyl)-19-nor-Δ⁵-androstene-3β,17β-diol lactone, and 6-fluoro-17α-(2'-carboxyethyl) - Δ⁵ - androstene-3β,17β-diol lactone were treated following the technique described in the foregoing example, yielding respectively: 3β-bromo-6-chloro-17α-(2'-carboxyethyl) - Δ⁵ - androsten-17β-ol lactone, 3β-bromo-6-chloro-17α-(2'carboxyethyl)-19-nor-Δ⁵-androsten-17β-ol lactone, 3β-bromo-6-fluoro-17α-(2'-carboxyethyl)-19-nor - Δ⁵ - androsten-17β-ol lactone, and 3β-bromo-6-fluoro-17α-(2'-carboxyethyl)-Δ⁵-androsten-17β-ol lactone.

We claim:

1. A compound of the following formula:

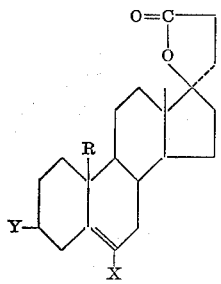

wherein R is selected from the group consisting of hydrogen and methyl; Y is selected from the group consisting of fluorine, chlorine and bromine and X is selected from the group consisting of fluorine and chlorine.

2. 3β,6-dichloro - 17α - (2'-carboxyethyl) - Δ⁵ - androsten-17β-ol-lactone.

3. 3β,6-dichloro - 17α - (2'carboxyethyl)-19-nor-Δ⁵-androsten-17β-ol-lactone.

4. 3β-chloro-6-fluoro - 17α - (2'-carboxyethyl)-19-nor-Δ⁵-androsten-17β-ol-lactone.

5. 3β-chloro-6-fluoro - 17α - (2'carboxyethyl) - Δ⁵-androsten-17β-ol-lactone.

6. 3β-fluoro-6-chloro - 17α - (2'carboxyethyl) - Δ⁵-androsten-17β-ol-lactone.

7. 3β-fluoro-6-chloro - 17α - (2'carboxyethyl)-19-nor-Δ⁵-androsten-17β-ol-lactone.

8. 3β,6-difluoro-17α-(2'carboxyethyl) - 19 - nor-Δ⁵-androsten-17β-ol-lactone.

9. 3β,6-difluoro-17α-(2'carboxyethyl - Δ⁵ - androsten-17β-ol-lactone.

10. 3β-bromo-6-fluoro-17α-(2'-carboxyethyl) - Δ⁵ - androsten-17β-ol-lactone.

11. A compound of the following formula:

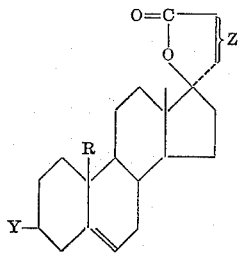

wherein R is selected from the group consisting of hydrogen and methyl; Y is selected from the group consisting of fluorine, chlorine and bromine; and Z is selected from the group consisting of a double bond and a saturated linkage.

12. 3β-chloro-17α-(2'-carboxyethyl) - Δ⁵ - androsten-17β-ol-lactone.

13. 3β-fluoro-17α-(2' - carboxyethyl) - Δ⁵ - androsten-17β-ol-lactone.

14. 3β-bromo-17α-(2' - carboxyethyl) - Δ⁵ - androsten-17β-ol-lactone.

15. 3β-fluoro-17α-(2'-carboxyethyl - 9 - nor-Δ⁵-androsten-17β-ol-lactone.

16. 3β-chloro-17α-(2' - carboxyethyl) - 19 - nor-Δ⁵-androsten-17β-ol-lactone.

17. 3β-fluoro-17α-(2' - carboxyvinyl) - Δ⁵ - androsten-17β-ol-lactone.

18. 3β-chloro-17α-(2' - carboxyvinyl) - Δ⁵ - androsten-17β-ol-lactone.

19. 3β-fluoro-17α-(2'-carboxyvinyl) - 19 - nor - Δ⁵-androsten-17β-ol-lactone.

20. 3β-chloro-17α-(2' - carboxyvinyl) - 19 - nor-Δ⁵-androsten-17β-ol-lactone.

No references cited.